US010233998B2

(12) United States Patent
Prunera-Usach et al.

(10) Patent No.: US 10,233,998 B2
(45) Date of Patent: Mar. 19, 2019

(54) INCORPORATION OF A GEAR TRAIN IN A PINION WALL IN A GEARBOX FOR A TURBOMACHINE

(71) Applicant: SAFRAN TRANSMISSION SYSTEMS, Colombes (FR)

(72) Inventors: Stephane Prunera-Usach, Rueil Malmaison (FR); Guillaume Beck, Chantilly (FR); Jordane Peltier, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 99 days.

(21) Appl. No.: 14/903,162

(22) PCT Filed: Jul. 9, 2014

(86) PCT No.: PCT/FR2014/051760
§ 371 (c)(1),
(2) Date: Jan. 6, 2016

(87) PCT Pub. No.: WO2015/004387
PCT Pub. Date: Jan. 15, 2015

(65) Prior Publication Data
US 2016/0146291 A1    May 26, 2016

(30) Foreign Application Priority Data

Jul. 10, 2013 (FR) ...................................... 13 56787

(51) Int. Cl.
*F16H 1/28* (2006.01)
*F16H 57/08* (2006.01)
*F02C 7/32* (2006.01)

(52) U.S. Cl.
CPC ............. *F16H 1/2854* (2013.01); *F02C 7/32* (2013.01); *F16H 1/28* (2013.01); *F16H 57/082* (2013.01);

(Continued)

(58) Field of Classification Search
CPC ...... F16H 37/082; F16H 1/28; F16H 2702/02; F16H 2200/2097; F16H 2200/2005; F05D 2220/323; F05D 2260/40311
See application file for complete search history.

(56) References Cited

U.S. PATENT DOCUMENTS 2,177,946 A * 10/1939 Pollard ................... F16H 15/28
475/215
2,863,334 A * 12/1958 Babcock ................ B23Q 5/048
192/48.1

(Continued)

FOREIGN PATENT DOCUMENTS

EP      2 405 116 A2     1/2012

OTHER PUBLICATIONS

U.S. Appl. No. 14/437,030, filed Apr. 20, 2015, 2015/0285153 A1, Jordane Peltier et al.

(Continued)

*Primary Examiner* — Stacey A Fluhart
(74) *Attorney, Agent, or Firm* — Oblon, McClelland, Maier & Neustadt, L.L.P.

(57) ABSTRACT

An aircraft drive chain including a plurality of main pinions meshing with each other, a first main pinion including a wall delimiting an inner volume, external teeth being provided on an outer surface of the wall, the external teeth meshing with at least one second main pinion, a gear system being incorporated in the inner volume, the first main pinion and the gear system being jointly configured to form a multiplier or reducer and to ensure a mechanical energy transfer between a driving member and a slave member.

10 Claims, 5 Drawing Sheets

(52) U.S. Cl.
CPC ............... *F05D 2220/323* (2013.01); *F05D 2260/40311* (2013.01)

(56) References Cited

U.S. PATENT DOCUMENTS

| | | | | |
|---|---|---|---|---|
| 3,974,718 | A * | 8/1976 | Kylberg | F16H 1/2836 |
| | | | | 475/347 |
| 4,133,224 | A * | 1/1979 | Blomquist | F16H 3/64 |
| | | | | 192/21 |
| 5,257,685 | A * | 11/1993 | Tichiaz | F02N 15/027 |
| | | | | 192/104 C |
| 5,558,593 | A * | 9/1996 | Roder | F16H 1/28 |
| | | | | 475/331 |
| 7,033,134 | B2 * | 4/2006 | Bristol | F02C 7/277 |
| | | | | 137/466 |
| 9,371,897 | B2 * | 6/2016 | Rademakers | F16H 37/082 |
| 2003/0145602 | A1 * | 8/2003 | Lane | F01D 25/18 |
| | | | | 60/787 |
| 2003/0220169 | A1 | 11/2003 | Norman | |
| 2010/0035718 | A1 | 2/2010 | Saitoh | |
| 2010/0167863 | A1 * | 7/2010 | Lemmers, Jr. | F02C 7/32 |
| | | | | 475/150 |
| 2012/0006137 | A1 | 1/2012 | Short et al. | |
| 2012/0108382 | A1 | 5/2012 | Saitoh et al. | |
| 2012/0178579 | A1 | 7/2012 | Hart et al. | |

OTHER PUBLICATIONS

International Search Report dated Oct. 9, 2014, in PCT/FR2014/051760 filed Jul. 9, 2014.
French Search Report dated Apr. 1, 2014, in French Application 1356787 filed Jul. 10, 2013.

* cited by examiner

INCORPORATION OF A GEAR TRAIN IN A PINION WALL IN A GEARBOX FOR A TURBOMACHINE

TECHNICAL FIELD AND PRIOR ART

The present invention relates to gear chains (or a drive chain) present in aircrafts.

These gear chains enable a transmission of the mechanical energy between driving members, for example a turbomachine starter or compressor, and slave members for example electric generator- or hydraulic pump-type accessories, or also the turbomachine itself in its starting phase, when it is driven into rotation by the starter. The accessory gearbox (AGB) is a particular example of a gear chain to drive accessories. An accessory gearbox structure of this type is described in the US patent application 2012/0006137.

A multiplying or reducing function generally enables the rotational speed of the input motion to be adapted to the parameters specific to each driving member or slave member.

For example, a starter includes two parts: a moveable member referred to as an impeller, and a reducer.

The aim of the invention is to provide a gear chain structure incorporating such a multiplying or reducing function, which is compact to limit the overall dimensions of the drive chain and/or accessories.

DISCLOSURE OF THE INVENTION

The invention thus relates to an accessory drive chain for an aircraft turbomachine comprising a plurality of main pinions meshing with each other, a first main pinion including a wall delimiting an inner volume, external teeth being provided on an outer surface of the wall, the external teeth meshing with at least one second main pinion, a gear system being incorporated in the inner volume, the first main pinion and the gear system being jointly configured to form a multiplier or reducer and to ensure a mechanical energy transfer between a driving member and a slave member.

The invention thus enables the integration of a multiplier (and/or a reducer) structure of an aircraft driving or slave member into a gear chain pinion rather than into the member itself. This enables a reduction of the volume of this member and of the weight which is cantilevered. This advantageously results on the one hand in reducing the constraints on the mounting flanges of this member and on the other hand in optimizing the inner volume of the module in which the gear chain is mounted.

Reducing the volume of the accessories facilitates the incorporation of the accessory gearbox into the turbomachine.

According to an advantageous feature, the gear system includes a annulus member, at least two planet pinions, a planet carrier member and sun teeth, the sun teeth being provided on a shaft connected to the driving member or to the slave member, internal teeth being provided on an inner surface of the annulus member, the planet pinions meshing with the internal teeth and the sun teeth.

According to an advantageous feature, the annulus member is the wall of the first main pinion, the planet carrier member being stationary with respect to an aircraft mount.

According to an alternative advantageous feature, the annulus member includes an annular wall stationary with respect to an aircraft mount, the planet carrier member being fixed to the pinion and stationary with respect to the same.

According to an advantageous feature, all the gears of the gear system are arranged so as to be crossed by a same mid-plane P crossing the external teeth.

According to advantageous alternative features, the gear system includes at least one planet pinion having first and second teeth of different diameters.

Such double teeth advantageously provide a significant range of transmission ratios with minimum overall dimensions.

According to an advantageous feature, a motion input towards the first main pinion can be made through the external teeth.

Alternatively or cumulatively, a motion input towards the first main pinion is made through the shaft connected to the driving member or through another shaft connected to the pinion and coaxial to the shaft.

According to a particular feature, the first main pinion is part of a ring bevel gear.

It is for example possible for the first main pinion of an AGB to be the closest pinion to the compressor shaft.

The abovedescribed gear chain is for example for an AGB type drive device.

The invention can also relate to an accessory gearbox including a drive chain such as abovedescribed.

BRIEF DESCRIPTION OF THE DRAWINGS

By way of non limiting examples, embodiments of the invention will now be described referring to the accompanying drawings, in which.

DETAILED DISCLOSURE OF PARTICULAR EMBODIMENTS

Figure 1A:
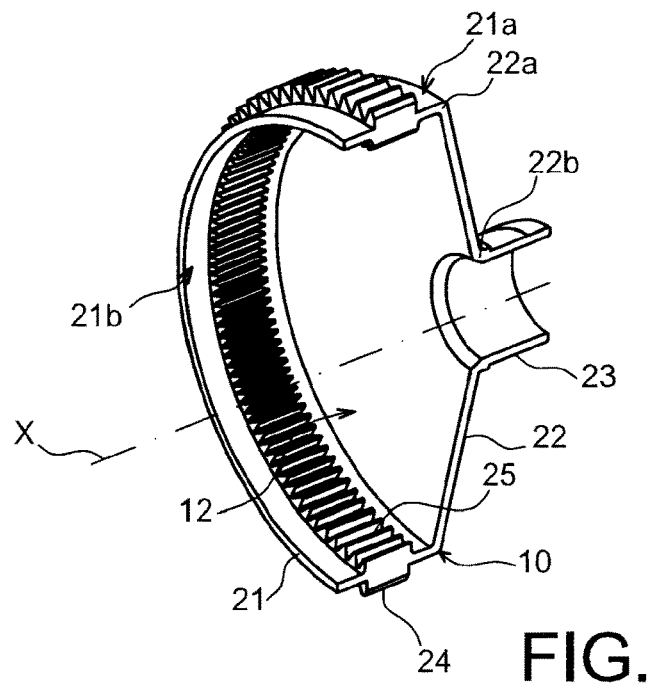
FIGS. 1A and 1B are perspective cross-section views showing on the one hand a pinion having an inner housing, and on the other hand a mechanical device combining this pinion and a multiplier incorporated in the inner housing (herein schematized by a block)

FIG. 1A depicts a pinion 10, also referred to as a toothed wheel, having the general shape of a funnel and the longitudinal orientation X.

In a particular layout, the pinion 10 includes a rim 21, a wall 22, a barrel 23, external teeth 24 and internal teeth 25.

The rim 21 and the barrel 23 are cylindrical and coaxial, the diameter of the barrel 23 being lower than the diameter of the rim 21. The barrel 23 is here a hollow shaft. Alternatively, the barrel 23 is a solid shaft. The wall 22 has here a frustoconical shape. The wall 22 is linked through a first circular edge 22a to an end edge of the rim 21, and through a second circular edge 22b, of a diameter lower than the first edge 22a, to an end edge of the barrel 23. As a non-represented alternative, the wall 22 is flat. The wall 22 can also include openings on part of its surface.

The rim 21 and the wall 22 jointly delimit an inner housing 12.

The external teeth 24 radially extend from an outer surface 21a of the rim 21 to the outside. The teeth 24 are here straight teeth. In another non represented alternative, these teeth are helical or of another type.

The internal teeth 25 radially extend from an inner surface 21b of the rim 21 to the inside, that is into the inner housing 12, here opposite the teeth 24. In the example depicted in FIGS. 1A, 1B and 3, the teeth 25 are straight teeth. In a non-represented alternative, these teeth are helical or of another type.

Figure 1B:
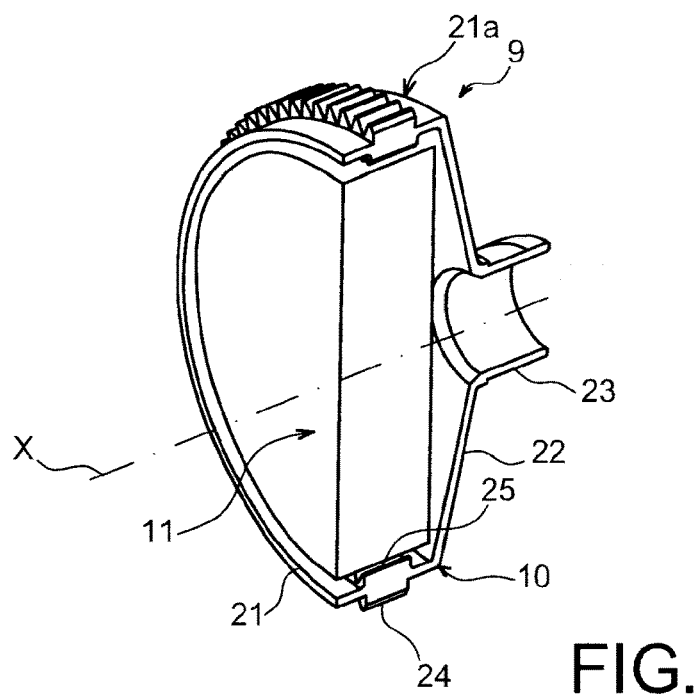

FIG. 1B depicts a mechanical device 9 in which a multiplier 11 is mounted in the inner housing 12 of the abovedescribed pinion 10. In FIG. 1B, the multiplier 11 is represented in a simplified form, by a half-cylinder.

Figure 3:
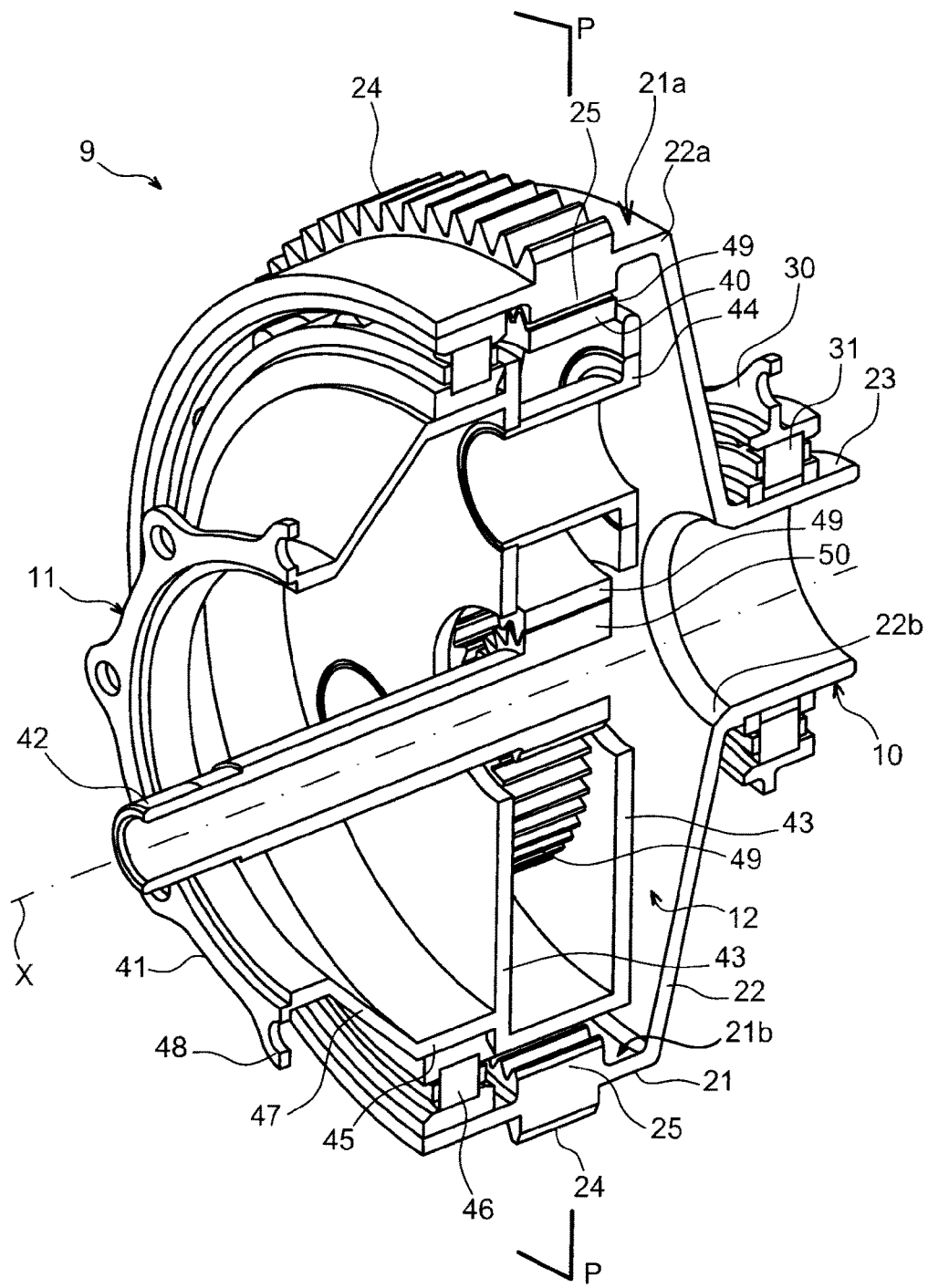
FIG. 3 is a perspective cross-section view of a first embodiment of the device of FIG. 1B according to a similar view point, detailing the multiplier incorporated in the inner housing of the pinion.

In the device 9 detailed in FIG. 3, the multiplier 11 includes planet gears 40 (or planet pinions), a planet carrier 41 and a shaft 42.

Here, planet gears 40 are toothed wheels with straight teeth 49. In a non-represented alternative, these teeth are helical or of other types. The teeth 49 are each meshed with the internal teeth 25. There are here three planet gears 40 (only two can be seen in FIG. 3). In a non-represented alternative, the number of planet gears is different from three, for example two or four.

The planet carrier 41 here includes two panels 43, a cylindrical portion 45, a frustoconical portion 47 and a flange 48.

The panels 43 are parallel to each other. Between them, these panels 43 support shafts 44 on which the planet gears 40 are mounted, each being assembled rotatably moveable through a non-represented system of the roller, bearing or another type.

The cylindrical portion 45 of the planet carrier 41 extends from the panel 43 farthest from the barrel 23. A bearing 46, here a roller, provides a rotation mechanical connection between the rim 21 of the pinion 10 and the portion 45. In a non-represented version, this rotation guiding is ensured by another technological element such as a bearing.

The frustoconical portion 47 extends by narrowing in the continuation of the cylindrical portion 45.

Finally, the flange 48 of the planet carrier 41 is arranged at the distal end of the frustoconical portion, transverse to the longitudinal orientation X. The flange 48 enables the multiplier 11 to be held in position with respect to a fixed frame (not represented).

The shaft 42 has straight teeth 50 at an end accommodated in the planet carrier 41. In a non-represented version, these teeth are helical or of another type. These teeth 50 are meshed with the teeth 49 of each of the planet gears 40. The shaft 42 is here provided coaxial with the barrel 23 and the rim 21. The teeth 50 are here formed directly at the end of the shaft 42. Alternatively, they can belong to a pinion (not depicted) mounted on the corresponding end on the shaft 42.

A flange 30 independent of the multiplier 11 and of the pinion 10, is mounted on the barrel 23 through a bearing 31, here a roller but it can be of another type such as a bearing. This flange 30 holds the pinion 10 in position with respect to a fixed frame (not represented).

Figure 4:
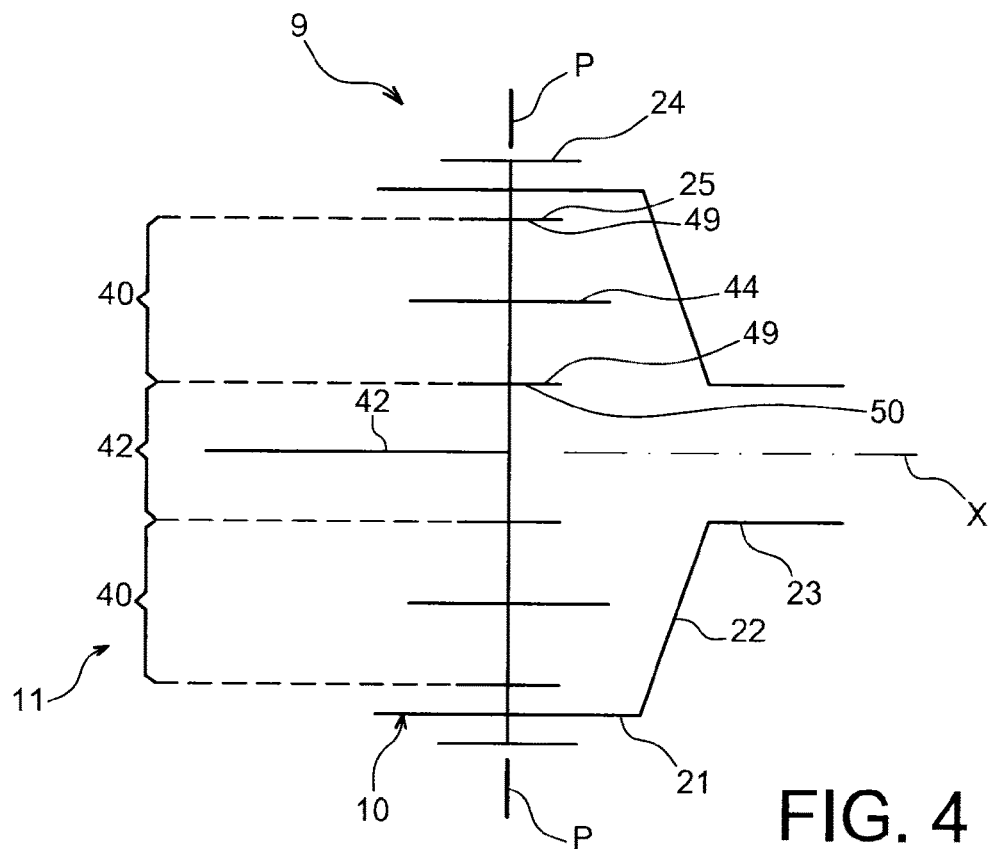
FIG. 4 is a cinematic diagram depicting the interactions between the elements of an alternative device of FIG. 3.

The device 9 represented in FIGS. 3 and 4 is in the form of a single planetary gear train in which the pinion 10 serves as a movable annulus via the internal teeth 25 and in which the teeth 50 provided on the shaft 42 serve as a movable (or sun) internal gear, the planet carrier 41 being fixed to a fixed frame. The word annulus refers to an annular element including internal teeth with which the planet pinions mesh.

An alternative embodiment 209 to the device 9 will be later described with reference to FIG. 6.

Figure 2A:
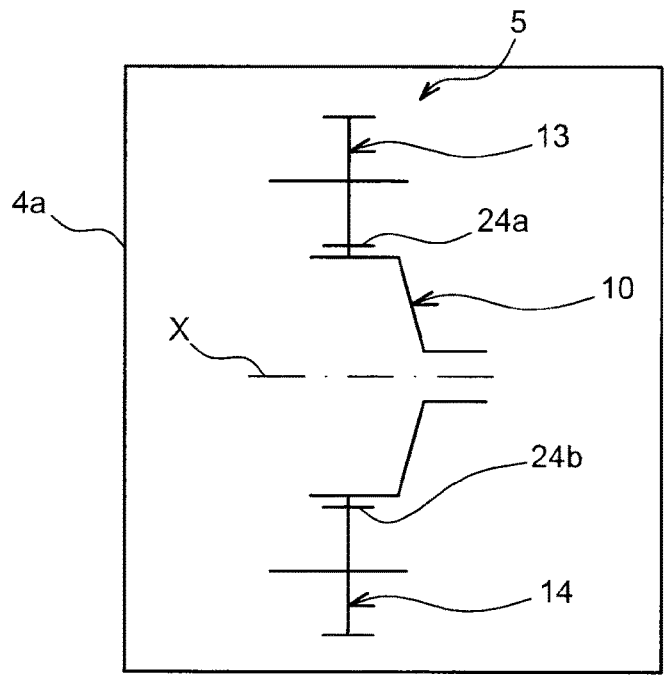
FIGS. 2A and 2B are cinematic diagrams depicting two possibilities of incorporating the pinion of FIGS. 1A and 1B in different gear chains, for example two AGBs, the multiplier not being represented.
Figure 2B:
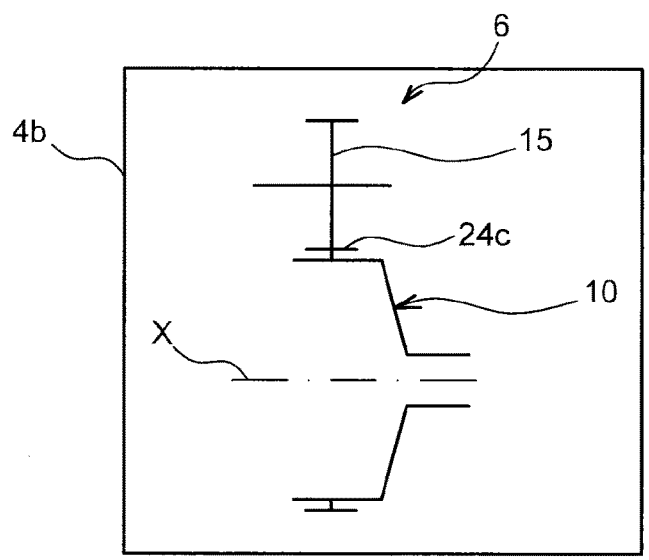

As can be seen in FIGS. 2A and 2B, the pinion 10 of the device 9 can be incorporated in different ways into a gear chain or drive chain (or drive train), inside an accessory gearbox, such as the boxes 4a and 4b described thereafter.

In FIG. 2A, the pinion 10 is mounted in a first drive train 5 of an accessory gearbox (AGB) 4a. More precisely, the pinion 10 is meshed by its teeth 24 both upstream in 24a with a toothed wheel 13 and downstream in 24b with a toothed wheel 14. By upstream, it is understood that the toothed wheel 13 is, inside the drive chain 5, the closest to a shaft of the turbomachine compressor from which it is possible to collect a mechanical motion. Rotating the toothed wheel 13 thus drives the pinion 10 and the toothed wheel 14 mounted downstream. The motion or power input towards the pinion 10 is then made through the external teeth 24.

In FIG. 2B, the pinion 10 is mounted with a second drive chain 6 of an accessory gearbox 4b. Here, the pinion 10 is meshed in 24c with a toothed wheel 15, at the end of the drive chain 6.

As an alternative, the motion input in the accessory gearbox 4a from the compressor shaft is made through the external teeth 24 of the pinion 10, that is the pinion 10 brings power to the gear chains 5 or 6 respectively including the pinions 13 and 14 (FIG. 2A) or 15 (FIG. 2B).

The examples of FIGS. 2A and 2B are not limiting and the pinion 10 can be mounted at different locations in a drive chain. Moreover, the number of toothed wheels in the drive chain can be different from two or three, for example, but without limitation one, four or five.

The shaft 42 is operably connected to a non-represented driving or slave member located outside the accessory gearbox.

When the motion input towards the pinion 10 is made through the external teeth 24, for example when the motion comes from the turbomachine compressor, such as above described, the multiplier 11 enables the accessory to be supplied at a desired rotational speed.

Alternatively, the accessory is replaced by a driving member (for example a starter) which itself drives the drive chain of the AGB. The motion or power input towards the pinion 10 is then made through the shaft 42 connected to the driving member, or also through the shaft 23 integral with the rim 21 of the pinion 10 and coaxial to the shaft 42.

Figure 7:
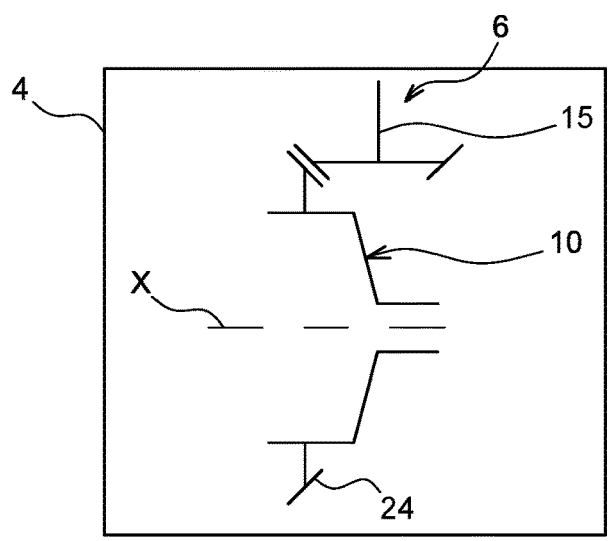
FIG. 7 is a cinematic diagram of another embodiment of the device.

As shown in FIG. 7, the pinion is part of a bevel gear and the external teeth are for example formed on a conical or frustoconical rim. The barrel 23 can be connected to another non-represented accessory located outside the accessory gearbox 4a or 4b, opposite the accessory connected to the shaft 42.

The abovedescribed device 9 can be used both as a multiplier or a reducer according to whether its drive into rotation is made by the barrel 23, the teeth 24 or the shaft 42.

An alternative of the abovedescribed device 9 is schematized in FIG. 4. In this view, there are four planet gears 40 (two of which can be seen in the section plane).

In the devices 9 represented in FIGS. 3 and 4, all the teeth of the multiplier 11 and of the pinion 10 are arranged in a same mid-plane P of the rim 21, the mid-plane P being transverse to the longitudinal direction X.

As an alternative, the teeth 24 and 25 are arranged staggered with respect to each other, that is other than facing on either side of the rim 21.

Figure 5:
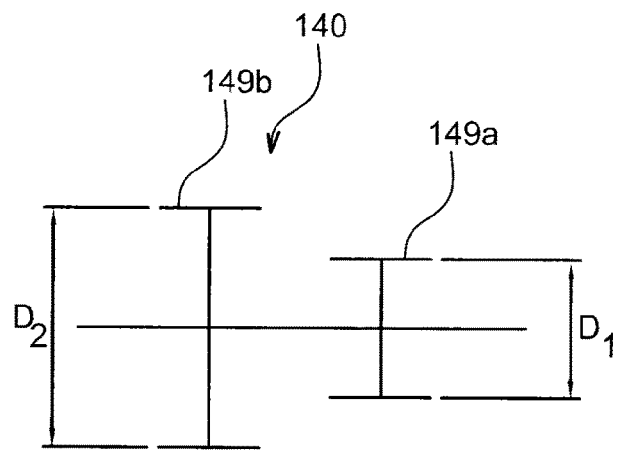
FIG. 5 is a diagram of a double planet pinion which can be used in another alternative device of FIG. 3.

Further alternatively, it is possible to use a double epicyclic gear train, that is including double planet gears 140 (see FIG. 5), in order to enable a different transmission ratio, for example more significant. In this case, each double planet gear 140 includes two external teeth 149a and 149b: first teeth 149a which are for example of a diameter D1 lower than the diameter D2 of second teeth 149b, the first teeth 149a being meshed with the teeth 50, the second teeth being meshed with the teeth 25.

Figure 6:
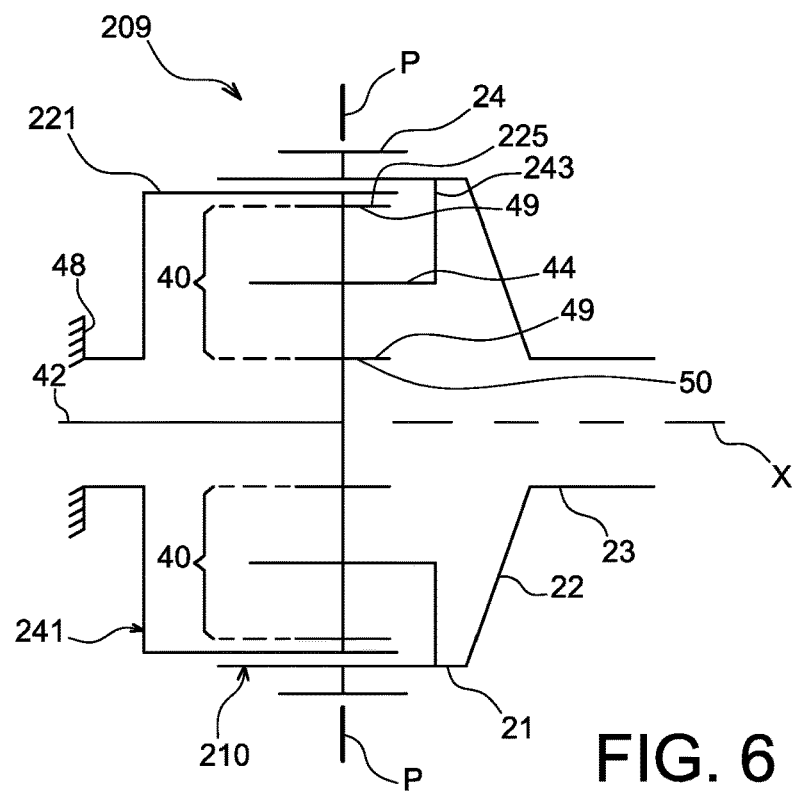
FIG. 6 is a cinematic diagram depicting the interactions between the elements of a second embodiment of the device of FIG. 1B.

The device 209 schematized in FIG. 6 is an alternative to the device 9 described with reference to FIGS. 3 and 4. The parts common to the devices 9 and 209 bear the same reference numerals and are not described again.

The device 209 includes a pinion 210 and an annulus 241.

The pinion 210 differs from pinion 10 in that it does not carry on its rim 21 internal teeth opposed to the external teeth 24. On the other hand, a panel 243 is linked to the inside face of the rim 21. The shafts 44 are mounted on the panel 243 and carry the pinions 40.

The annulus 241 has an annular portion 221 coaxial with the rim 21 of the pinion 210. This annular portion 221 carries internal teeth 225 which mesh with the teeth 49. The annulus 241 is here fixed to a frame of the fixed accessory gearbox via a flange 48.

The device 209 represented in FIG. 6 is in the form of a single epicyclic gear train in which the pinion 210 serves as a movable planet carrier.

Other alternative embodiments are still possible without departing from the scope of the invention. For example, in the embodiment described with reference to FIGS. 3 and 4, it is possible to insert a free wheel system (for example of the ratchet wheel type) between the rim 21 and the planet gears 40, the teeth 25 being then provided on an internal ring of the free wheel system. Also, in the embodiment described with reference to FIG. 6, it is possible to insert a free wheel system between the rim 221 and the planet gears 40.

With reference to FIGS. 2A and 2B, the gear chains 5 and 6 have been described mounted in an accessory gearbox (or AGB) 4a or 4b.

Generally speaking, it will be understood that the invention is not limited to the abovedescribed exemplary devices. The invention can be applied to any accessory driven by the accessory gearbox and which requires a specific multiplying or reducing function.

The invention claimed is:

1. An aircraft drive chain comprising:
   a first main pinion including, a barrel, a wall delimiting an inner volume, and external teeth being provided on an outer surface of the wall, the barrel and the wall being cylindrical and coaxial with a diameter of the barrel being smaller than a diameter of the wall;
   a second main pinion meshing with the external teeth of the first main pinion; and
   a gear system being incorporated into the inner volume of the first main pinion, the first main pinion and the gear system being jointly configured to form a multiplier or reducer and to ensure a mechanical energy transfer between a driving member and a slave member,
   wherein the gear system includes first and second planet pinions, a planet carrier member, and a shaft connected to the driving member or to the slave member,
   wherein sun teeth are provided on the shaft of the gear system,
   wherein internal teeth are provided on an inner surface of the wall of the first main pinion,
   wherein each of the first and second planet pinions mesh with the internal teeth and with the sun teeth,
   wherein the planet carrier member includes first and second panels which are parallel to each other and which support shafts on which the planet pinions are mounted, a cylindrical portion extending from the first panel, the first panel being disposed further from the barrel than the second panel, and a frustoconical portion extending in continuation of the cylindrical portion, a free end of the frustoconical portion including a flange enabling the gear system to be held in position with respect to a fixed frame, and
   wherein a bearing is disposed between the cylindrical portion of the planet carrier member and the inner surface of the wall of the first main pinion so as to provide a rotation mechanical connection therebetween.

2. The drive chain according to claim 1, wherein the planet carrier member is stationary with respect to an aircraft mount.

3. The drive chain according to claim 1, wherein the first and second planet pinions are arranged so as to be crossed by a same mid-plane crossing the external teeth.

4. The drive chain according to claim 1, wherein the first planet pinion and the second planet pinion have different diameters.

5. The drive chain according to claim 1, wherein a motion input for rotating the first main pinion is provided at the external teeth.

6. The drive chain according to claim 1, wherein a motion input for rotating the first main pinion is made through the shaft connected to the driving member or through another shaft connected to the first main pinion and coaxial to the shaft.

7. The drive chain according to claim 1, wherein the first main pinion is part of a bevel gear.

8. The drive chain according to claim 1, for an accessory gearbox driving device.

9. An accessory gearbox including a drive chain according to claim 1.

10. An aircraft drive chain comprising:
    a first main pinion including, a barrel, a wall delimiting an inner volume, and external teeth being provided on an outer surface of the wall, the barrel and the wall being cylindrical and coaxial with a diameter of the barrel being smaller than a diameter of the wall;
    a second main pinion meshing with the external teeth of the first main pinion; and
    a gear system being incorporated into the inner volume of the first main pinion, the first main pinion and the gear system being jointly configured to form a multiplier or reducer and to ensure a mechanical energy transfer between a driving member and a slave member,
    wherein the gear system includes first and second planet pinions, a planet carrier member, and a shaft connected to the driving member or to the slave member,
    wherein sun teeth are provided on the shaft of the gear system,
    wherein internal teeth are provided on an annular wall which is stationary with respect to an aircraft mount via a flange,
    wherein each of the first and second planet pinions mesh with the internal teeth and with the sun teeth,
    wherein the planet carrier member includes a panel linked to an inside surface of the wall of the first main pinion which support shafts on which the planet pinions are mounted such that the planet carrier member is fixed to the first main pinion and is stationary with respect to the first main pinion.

\* \* \* \* \*